(12) United States Patent
    Sekar (10) Patent No.: US 9,378,270 B2
(45) Date of Patent: Jun. 28, 2016

(54) SYSTEMS AND METHODS FOR GENERATING NATURAL LANGUAGE INSIGHTS ABOUT SETS OF DATA

(71) Applicant: Oracle International Corporation, Redwood Shores, CA (US)

(72) Inventor: Lakshminarayanan Sekar, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 8 days.

(21) Appl. No.: 14/314,261

(22) Filed: Jun. 25, 2014

(65) Prior Publication Data

US 2015/0378987 A1    Dec. 31, 2015

(51) Int. Cl.
    G06F 17/28    (2006.01)
    G06F 17/24    (2006.01)
    G06F 17/30    (2006.01)

(52) U.S. Cl.
    CPC .......... *G06F 17/3061* (2013.01); *G06F 17/248* (2013.01)

(58) Field of Classification Search
    CPC ............................. G06F 17/28; G06F 17/248
    See application file for complete search history.

(56) References Cited

U.S. PATENT DOCUMENTS

| | | | |
|---|---|---|---|
| 2008/0256023 A1* | 10/2008 | Nair | 707/2 |
| 2011/0274448 A1* | 11/2011 | Yamashita | G03G 15/0216 399/31 |
| 2013/0260352 A1* | 10/2013 | Abraham | G09B 7/02 434/350 |
| 2014/0358890 A1* | 12/2014 | Chen et al. | 707/710 |

\* cited by examiner

*Primary Examiner* — Qian Yang
(74) *Attorney, Agent, or Firm* — Kilpatrick Townsend & Stockton LLP (57) ABSTRACT

Embodiments of the invention provide systems and methods for generating natural language insights about a set of data. More specifically, embodiments of the present invention are directed to methods and systems that transform data into insights or actionable information. The output generated by embodiments of the present invention would be equivalent to that of an observation made or insights gathered by a qualified data scientist presented with the same data. Embodiments as described herein can include an insight engine that can analyze both structured and unstructured data and generate information in a natural language of the user's choice. Insights provided by embodiments described herein can be supported by an ability to drilldown to graphs/tables and atomic data and provide a good starting point for further analysis.

18 Claims, 7 Drawing Sheets

SYSTEMS AND METHODS FOR GENERATING NATURAL LANGUAGE INSIGHTS ABOUT SETS OF DATA

BACKGROUND OF THE INVENTION

Embodiments of the present invention relate generally to methods and systems for analyzing a collection of data and more particularly to generating natural language insights about a set of data.

There is explosion in the volume of data generated and maintained today. It is estimated that ninety percent of the data available now was generated in the last two years. Business organizations have a tough time getting value out of all the generated and collected data. Data interpretation is largely done manually using available business intelligence tools. However, these tools stop at displaying data in the form of tables and graphs. Interpretation of these tables and graphs is then left to business analysts. As a result, the insight gained from this data can be person-dependent and tool-dependent. Additionally, the typical business analyst does not have the skills in statistics, data mining, data wrangling, and programming required to effectively analyze large volumes of data. Industry has tried to solve the problem hiring data scientists who are scarce. Hence, there is a need for improved methods and systems for analyzing a set of data.

BRIEF SUMMARY OF THE INVENTION

Embodiments of the invention provide systems and methods for generating natural language insights about a set of data. According to one embodiment, generating natural language insights about a set of data can comprise defining an analysis to be performed on the set of data for each of a plurality of questions. Defining the analysis to be performed on the set of data for each of the plurality of questions can comprise creating one or more question templates for the question, identifying one or more measures of the analysis and one or more dimensions of the collection of data upon which the analysis will be performed, defining processes for performing the analysis, identifying one or more observations available on results of performing the defined processes, and creating one or more answer templates for each identified observation. At least one of the questions can then be received. The received question can comprise a natural language query and receiving the question can comprise applying at least one of the question templates to the received question.

The defined analysis for the received question can be performed on at least a subset of the set of data. Performing the defined analysis for the received question can comprise identifying an analysis to be performed and dimensions of the data to be used based on the received question, collecting, from the set of data, the subset of data based on the identified dimensions, executing the defined processes for performing the analysis on the collected sub-set of data, populating one or more answer templates with the analysis results based on the identified observations for the analysis, and generating the natural language answer based on the populated answer template. In some cases, collecting, from the set of data, the subset of data based on the identified dimensions can comprise using an attribute-weighted data mining algorithm.

A natural language answer to the received question can then be provided based on performing the defined analysis for the received question. For example, providing the natural language answer can comprise providing one or more of an email, a micro-blog message, an instant message, a voice message, or a graphical or textual representation on a web page. In some cases, providing the natural language answer can be based on a difference between a value of a measure represented in a previously provided answer and a current value of the measure exceeding a suppression threshold value.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for generating natural language insights about a set of data. More specifically, embodiments of the present invention are directed to methods and systems that transform data into insights or actionable information. The output generated by embodiments of the present invention would be equivalent to that of an observation made or insights gathered by a qualified data scientist presented with the same data. Embodiments as described herein can include an insight engine that can analyze both structured and unstructured data and generate information in a natural language of the user's choice. Insights provided by embodiments described herein can be supported by an ability to drilldown to graphs/tables and atomic data and provide a good starting point for further analysis. Various additional details of embodiments of the present invention will be described below with reference to the figures.

Figure 1:
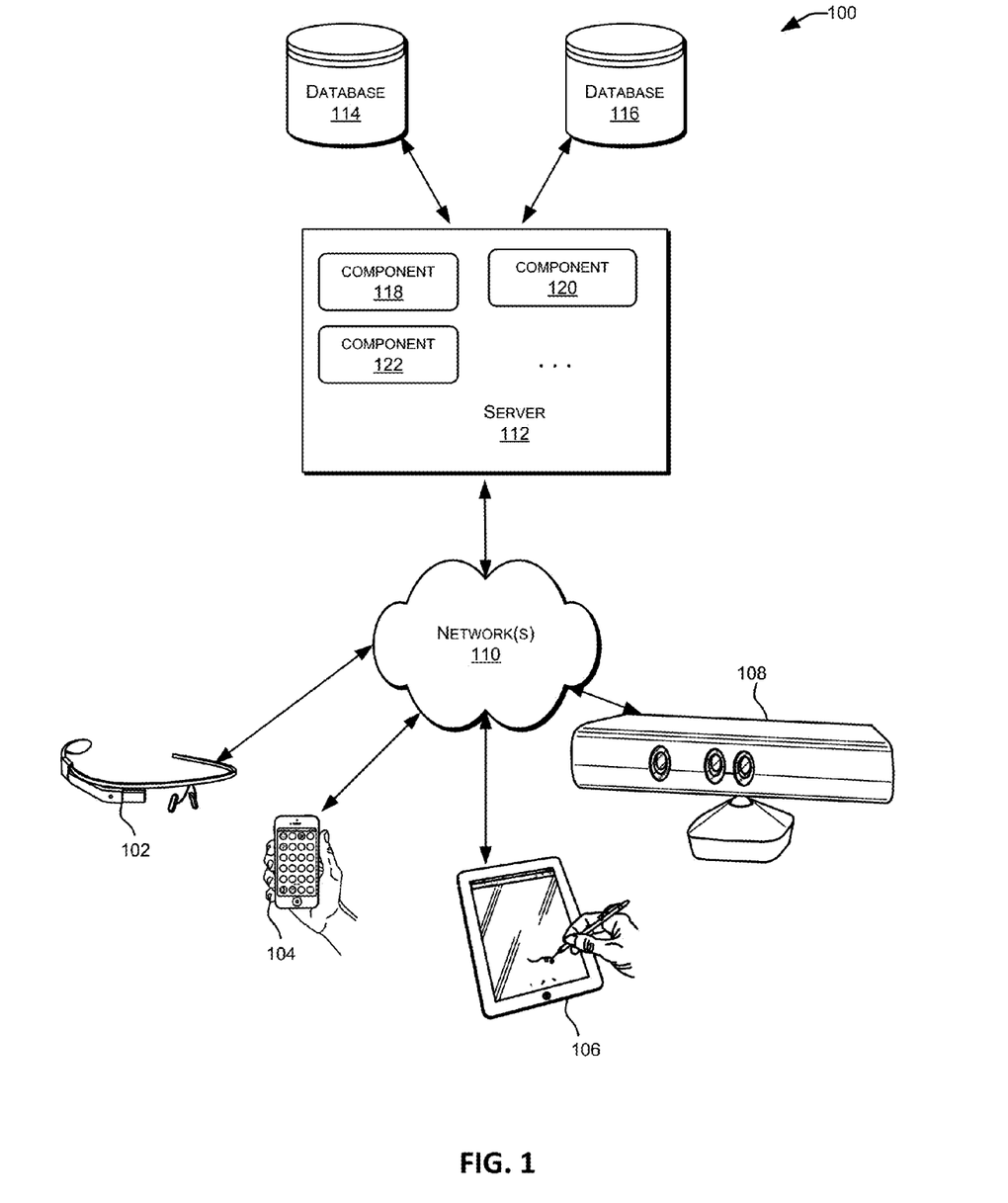
FIG. 1 is a block diagram illustrating components of an exemplary distributed system in which various embodiments of the present invention may be implemented.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
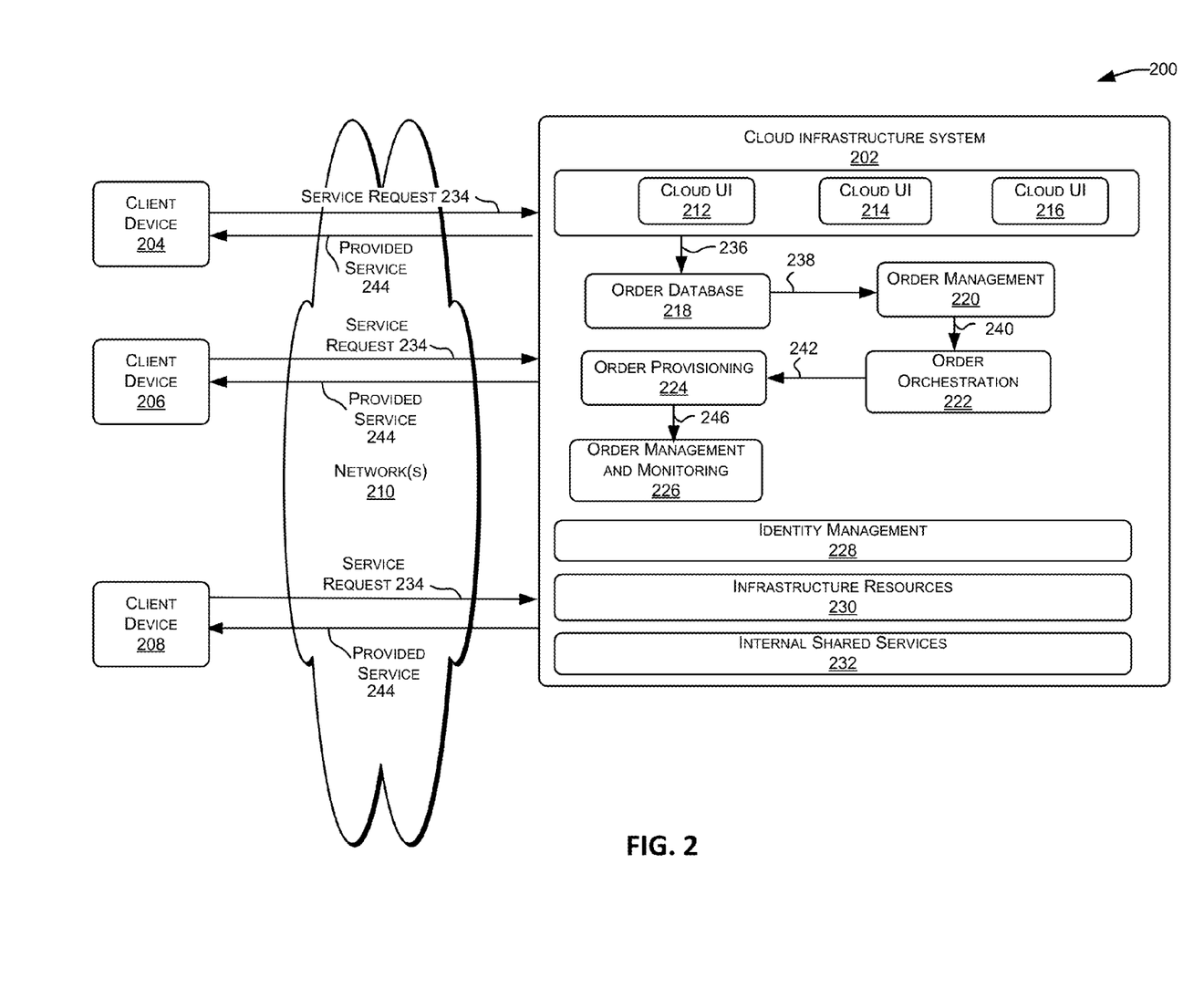
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
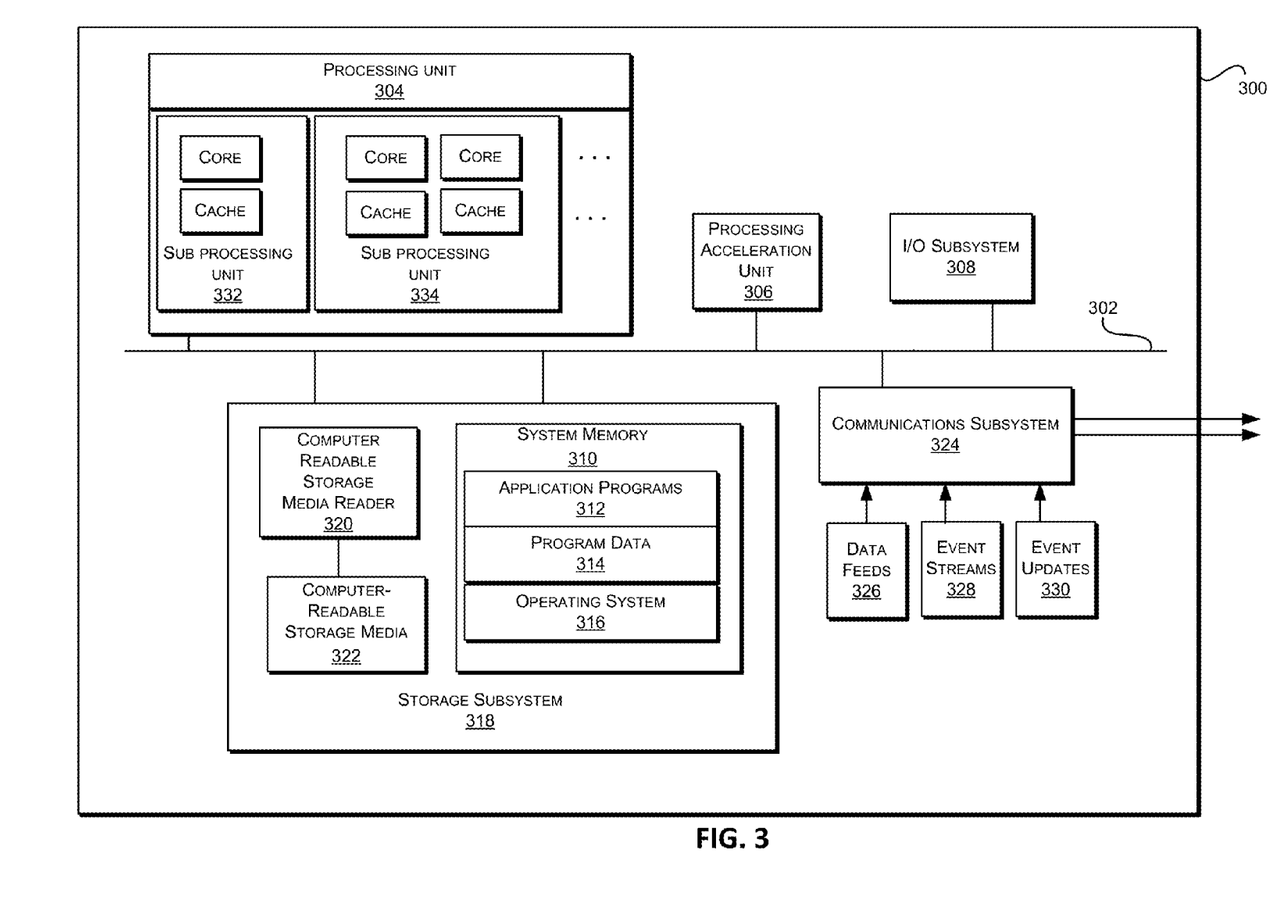
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
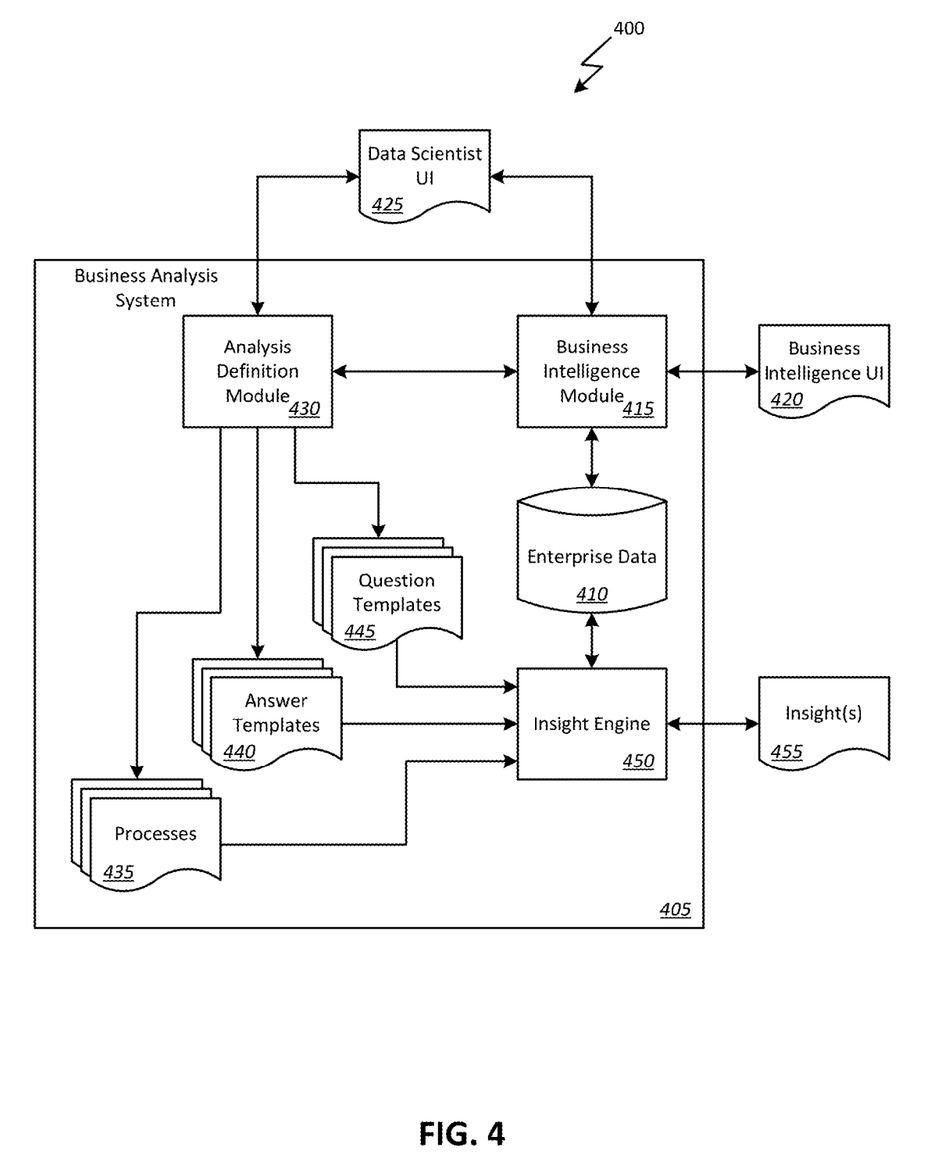
FIG. 4 is a block diagram illustrating, at a high-level, functional components of a system for generating natural language insights about a set of data according to one embodiment of the present invention.

FIG. 4 is a block diagram illustrating, at a high-level, functional components of a system for generating natural language insights about a set of data according to one embodiment of the present invention. As noted above, embodiments provide a system 405 for generating natural language insights about a set of data 410 such as enterprise data. It should be noted that while referred to here as enterprise data, this data 410 can be any data, big or small, structured or unstructured. The system 405 can also include any of a variety of known business analysis modules 415 or tools providing charts, graphs, tables, or other representations of the data 410 through a business intelligence user interface 420.

Additionally, the system 405 can include an insight engine 450 that can, together with the business intelligence module 415, transform the data 410 into insights 455 or actionable information. Insights 455 can be considered to be interpretations of data in a natural language expression made in the language of choice. These interpretations can be the same as may be made by a qualified data scientist when analyzing the same data 410. Insights provided by embodiments described herein can be supported by an ability, e.g., through the business intelligence module 415 and business intelligence user interface 420, to drilldown to graphs/tables and atomic data. The insights 455 and business intelligence user interface 420 may be presented together or through different interfaces. For example, insights 455 might be presented through a dashboard or other interface through which the business intelligence user interface 420 may be launched. Additionally or alternatively, the insights 455 might be provided through messages such as emails, instant messages, micro-blog messages, etc.

The system can also include an analysis definition module 430 for defining a set of question templates 445, answer templates 440, and metadata 435 which can then be used by the insight engine 450 to generate the insights 455. In some cases, the analysis definition module 430 can present a data scientist user interface 435 through which a data scientist, programmer, analyst or other user can identify the measures and dimensions to use in a particular analysis. Additionally or alternatively, the analysis definition module 430 can follow the tasks performed by the data scientist. For example, he may use tools of the business intelligence module 415 to identify the best dimensions to analyze the measures in the data 410. He may use several tools of the business intelligence module 415 to further analyze the data 410 using the dimensions identified in prior step. This may be asking questions like: which are the top 3 products by revenue in the current quarter; what is the revenue growth compared to last quarter; etc.

For each question asked, there can be an observation made by the data scientist. This may be in the form: Product A, B, C are the top 3 products by revenue; revenue grew by 30% compared to last quarter; etc. Each of the observations made may be noted and text templates 440 and 445 can be defined for the question asked and for the answer given, i.e., observation made. It should be understood that these templates 440 and 445 can be translated to various different languages to be supported.

The analysis definition module 430 can also define one or more processes 435 to collect and analyze data 410 to replicate the analysis performed by the data scientist. For example, these processes 435 can identify dimensions to be used in the analysis using attribute importance algorithms in data mining tools. Further for each question or analysis performed, the defined processes can programmatically perform the same operation, capture the results of the analysis, and populate the templates 440 associated to the insight output to be provided. The processes 435 and/or insight engine 450 can generate the output in a variety of forms such as email, audio messages, a widget on any web page, etc.

Stated another way, generating natural language insights 455 about a set of data 410 can comprise the analysis definition module 430 defining an analysis to be performed on the set of data 410 for each of a plurality of questions. Generally speaking, defining an analysis can comprise defining tasks and/or processes 435 to be performed on the set of data to provide answers to particular one or more questions.

More specifically, defining an analysis to be performed on a set of data for each of a plurality of questions can comprise the analysis definition module 430 creating one or more question templates 445 for the question. As noted above, the received question can comprise a natural language expression of a query or request. Thus, the question template 445 can comprise a fillable, partial expression that can be used to receive the question or which can be applied to the received question, i.e., to identify variable portions of the question defined in the template such as one or more measures, dimensions, attributes, etc. to be used by when performing the analysis. Thus, one or more measures of the analysis and one or more dimensions of the collection of data upon which the analysis will be performed can also be identified.

Processes 435 for performing the analysis directed to the identified measures and using the identified dimensions and/or attributes can be defined by the analysis definition module 430. The processes can comprise, for example, queries to and/or workflows to be executed by the business intelligence module 415 Defining the processes 435 can be based, for example, on processes performed by a data scientist or analyst, e.g., using the business intelligence module 415 and through the data scientist user interface 425 and/or business intelligence user interface 420. Thus, the processes 435 may be defined by such individuals through the data scientist user interface 425 and analysis definition module or may be defined automatically by the analysis definition module 430 by monitoring and recording the processes and/or tasks performed by such individuals and generating the processes 435 based thereon.

Along with defining the processes 435, one or more answers available on results of performing the defined processes 435 can be identified by the analysis definition module 430. That is, observations, comments, evaluations, or other insights such as may be made by a data scientist or other analyst on results of the analysis can be identified and defined as answers to the received questions and based on the defined analysis. These observations may be identified and defined through the analysis definition module 430 or may be identified and defined automatically by the analysis definition module 430 by monitoring and recording the answers provided by a data scientist or other analyst. One or more answer templates 440 can then be created by the analysis definition module 430 for each identified observation. The answer template 440 can comprise a fillable, natural-language expression that can be used to provide the generated insights based on results of performing the associated analysis. That is, the templates 440 can include variables to be provided by the results of the analysis and which can complete the expression of the insight as identified by the template.

After the analysis has been defined by the analysis definition module 430, at least one of the questions may be received, e.g., through the data scientist user interface 425, through the business intelligence user interface 420, from another workflow or process, etc. Receiving the question can comprise receiving a query in the form of a natural language expression directed to uncovering some insight into the data 410. In response to receiving the question, the defined analysis for the received question can be identified by the insight engine 450 and performed by the business intelligence module 415 on at least a subset of the set of data 410 and a natural language answer or insight 455 to the received question can be provided by the insight engine 450 based on the business intelligence module 415 performing the defined analysis for the received question.

Generally speaking, performing the analysis can comprise the insight engine 450 selecting the previously defined processes 435 and/or tasks, perhaps using information from the questions such as selected measures, dimensions, attributes, etc. More specifically, performing the defined analysis for the received question can comprise the insight engine 450 identifying the analysis to be performed and dimensions of the data 410 to be used based on the received question. That is, an analysis can be selected by the insight engine 450 from a set of defined analysis based on user input, the questions selected or defined, and/or on other factors. As noted above, the selected analysis can be a defined query or set of queries and/or workflows to be executed by the insight engine 450 and/or business intelligence module 415. A subset of data 410 can be collected from the set of data 410 for the identified dimensions based on such queries. Collecting the subset of data from the set of data 410 based on the identified dimensions can further comprise using an attribute-weighted data mining algorithm to select the subset from the larger collection of data 410. Such an algorithm can weight attributes of the data, for example, based on a history indicating how often that attribute was found to be relevant or of interest for a particular analysis or generated insight. Other factors for weighting are contemplated and considered to be within the scope of the present invention.

Once the subset of data has been collected, the defined processes 435 for performing the analysis, e.g., one or more workflows, scripts, etc., can be executed by the business intelligence module 415 on the collected sub-set of data. Using results of executing the analysis, one or more answer templates 440 as described above can be populated by the insight engine 450 with the analysis results and based on the identified observations for the analysis. The natural language answer to the received question or insight 455 can then be generated by the insight engine 450 based on the populated answer template 440. As noted above, this answer can comprise an email, a micro-blog message, an instant message, a voice message, or a graphical or textual representation on a web page or other interface. However, other types or forms of output are contemplated and considered to be within the scope of the present invention. In some cases, providing the natural language answer may be subject to a threshold-based suppression by the insight engine 450. That is, providing 520 the natural language answer can be based on a difference between a value of a measure represented in a previously provided answer and a current value of the measure exceeding a suppression threshold value.

In various implementations, a number of variations and/or enhancements may also be supported by the system 405. For example, the insight engine 450 may be tunable or configurable to generate more or fewer insights for a user-selectable number of dimensions or levels, e.g., level 0 (Time) to level n, for n dimensional analysis in the order of attribute importance. Additionally or alternatively, a subscription model may be supported in which a user picks specific fact/measures of interest and for which insights can be periodically, on request, on a change, etc., be provided. In some cases, generation and/or output of specific insights may be influenced by users with votes, e.g., "like/dislike." Additionally or alternatively, the system may provide support for analyst entered insights to augment system generated insights. In some cases, the system may support searchable insights, e.g., based on a text search and ranked by importance. According to one embodiment, the system can additionally or alternatively support voice integration in which insights can be delivered as audio file for "Intelligence on the Go" and which can be interactive and voice-driven, e.g., "more" (for drill down), "less" (for drill up), "skip," "back," "next," "detail," "summary," etc. Additionally or alternatively, embodiments may provide an ability to associate ownership/responsibility for insights that are based on metrics for taking action and/or may support for private insights and public insights, e.g., controlled based on identity, role, etc. In some cases, the system may further support insight recommendations provided by or based on analysts who viewed a particular and found it to be especially useful or helpful.

Figure 5:
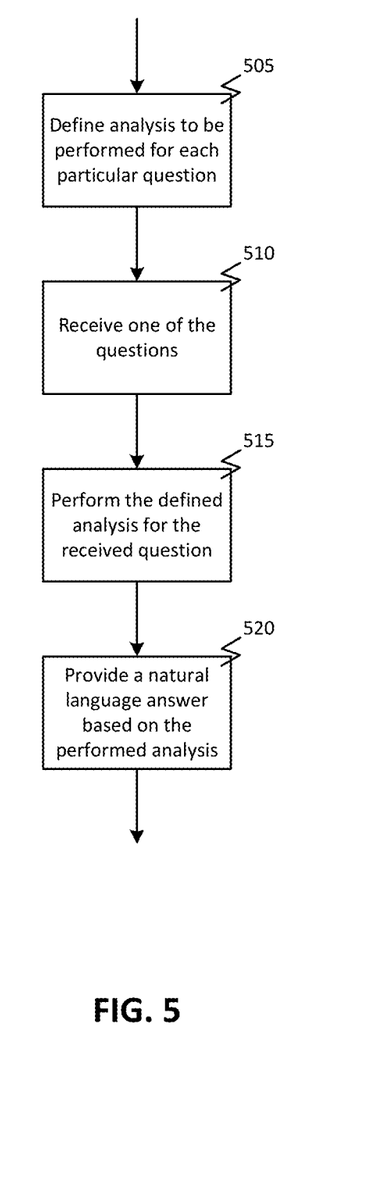
FIG. 5 is a flowchart illustrating a process for generating natural language insights about a set of data according to one embodiment of the present invention.

FIG. 5 is a flowchart illustrating a process for generating natural language insights about a set of data according to one embodiment of the present invention. As illustrated in this example, generating natural language insights about a set of data can comprise defining 505 an analysis to be performed on the set of data for each of a plurality of questions. Generally speaking, defining 505 an analysis can comprise defining tasks and/or processes to be performed on the set of data to provide answers to particular one or more questions. Additional details of an exemplary process for defining 505 an analysis will be described below with reference to FIG. 6.

After the analysis has been defined, at least one of the questions may be received 510. Receiving 510 the question can comprise receiving a query in the form of a natural language expression directed to uncovering some insight into the data. In response to receiving the question, the defined analysis for the received question can be performed 515 on at least a subset of the set of data and a natural language answer to the received question can be provided 520 based on performing 515 the defined analysis for the received question. Generally speaking, performing 515 the analysis can comprise executing the previously defined processes and/or tasks on the set of data, using information from the questions such as selected measures, dimensions, attributes, etc. Additional details of an exemplary process for performing 515 the analysis will be described below with reference to FIG. 7.

Providing 520 the natural language answer can comprise providing one or more of an email, a micro-blog message, an instant message, a voice message, or a graphical or textual representation on a web page or other interface. However, other types or forms of output are contemplated and considered to be within the scope of the present invention. In some cases, providing 520 the natural language answer may be subject to a threshold-based suppression. That is, providing 520 the natural language answer can be based on a difference between a value of a measure represented in a previously provided answer and a current value of the measure exceeding a suppression threshold value.

Figure 6:
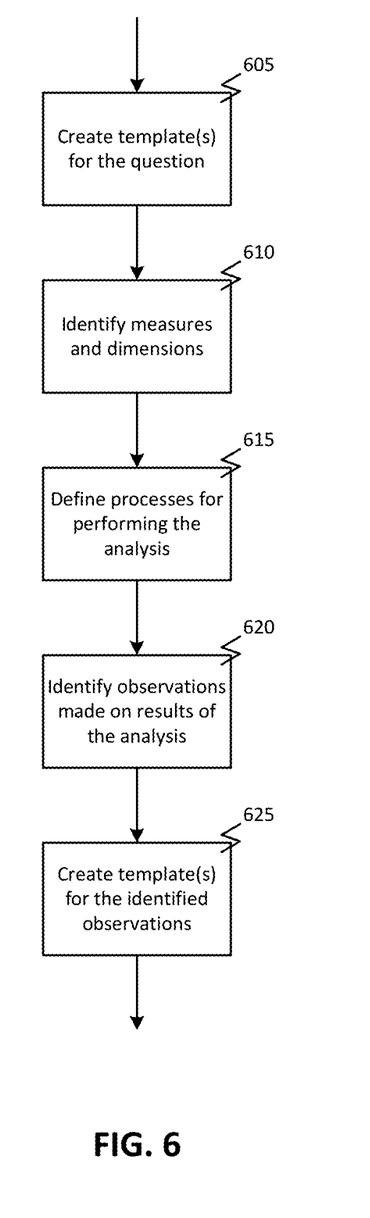
FIG. 6 is a flowchart illustrating a process for defining an analysis to be performed on a set of data according to one embodiment of the present invention.

FIG. 6 is a flowchart illustrating a process for defining an analysis to be performed on a set of data according to one embodiment of the present invention. As illustrated in this example, defining an analysis to be performed on a set of data for each of a plurality of questions can comprise creating 605 one or more question templates for the question. As noted above, the received question can comprise a natural language expression of a query or request. Thus, the question template can comprise a fillable, partial expression that can be used to receive the question or which can be applied to the received question, i.e., to identify variable portions of the question defined in the template such as one or more measures, dimensions, attributes, etc. to be used by when performing the analysis. Thus, one or more measures of the analysis and one or more dimensions of the collection of data upon which the analysis will be performed can also be identified 610.

Processes for performing the analysis directed to the identified measures and using the identified dimensions and/or attributes can be defined 615. Defining 615 the processes can be based, for example, on processes performed by a data scientist or analyst. Thus, the processes may be defined by such individuals or may be defined by monitoring and recording the processes and/or tasks performed by such individuals and generating the processes based thereon.

Along with defining 615 the processes, one or more observations available on results of performing the defined processes can be identified 620. That is, observations, comments, evaluations, or other insights such as may be made by a data scientist or other analyst on results of the analysis can be identified and defined. These observations processes may be identified and defined by such individuals or may be identified and defined by monitoring and recording the answers provided by such individuals. One or more answer templates can then be created 625 for each identified observation. The answer template can comprise a fillable, natural-language expression that can be used to provide the generated insights based on results of performing the associated analysis. That is, the templates can include variables to be provided by the results of the analysis and which can complete the expression of the insight as identified by the template.

Figure 7:
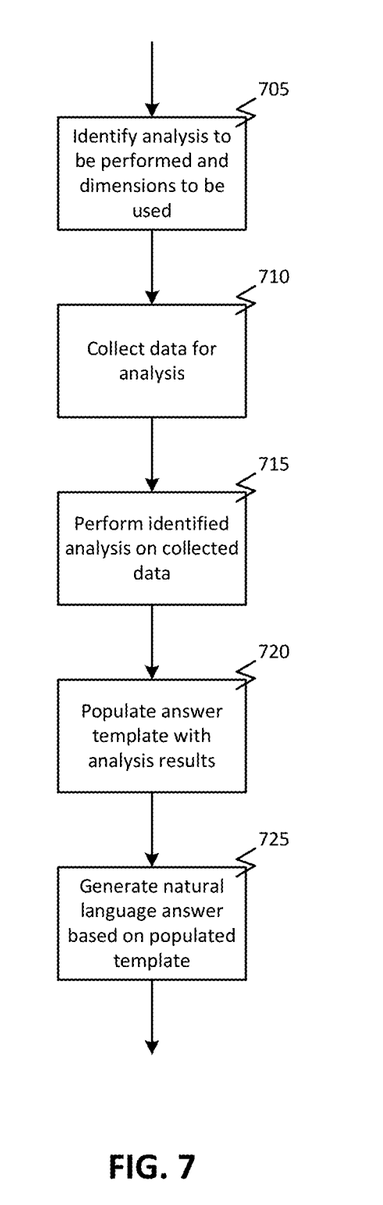
FIG. 7 is a flowchart illustrating a process for performing a defined analysis on a set of data for a received question according to one embodiment of the present invention.

FIG. 7 is a flowchart illustrating a process for performing a defined analysis on a set of data for a received question according to one embodiment of the present invention. As illustrated in this example, performing the defined analysis for the received question can comprise identifying 705 the analysis to be performed and dimensions of the data to be used based on the received question. That is, an analysis can be selected from a set of defined analysis based on user input, the questions selected or defined, and/or on other factors. A subset of data can be collected 710 from the set of data based on the identified dimensions. Collecting 710 the subset of data from the set of data based on the identified dimensions can comprise using an attribute-weighted data mining algorithm to select the subset from the larger collection of data. Such an algorithm can weight attributes of the data, for example, based on a history indicating how often that attribute was found to be relevant or of interest for a particular analysis or generated insight. Other factors for weighting are contemplated and considered to be within the scope of the present invention.

Once the subset of data has been collected 710, the defined processes for performing the analysis can be executed 715 on the collected sub-set of data. Using results of executing 715 the analysis, one or more answer templates as described above can be populated 720 with the analysis results and based on the identified observations for the analysis. The natural language answer to the received question can then be generated 725 based on the populated answer template. As noted above, this answer can comprise an email, a micro-blog message, an instant message, a voice message, or a graphical or textual representation on a web page or other interface. However, other types or forms of output are contemplated and considered to be within the scope of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for generating natural language insights about a set of data, the method comprising:
   storing by a server system the set of data in one or more data stores of the server system;
   defining by the server system an analysis to be performed on the set of data for each question of a plurality of questions;
   processing information received by the server system from a computing device via a network to identify at least one question of the plurality of questions;
   performing by the server system the defined analysis for the identified at least one question on at least a subset of the set of data, and generating a natural language answer to the identified at least one question based at least in part on performing the defined analysis for the identified at least one question;
   transmitting by the server system a transmission to the computing device to cause display of the natural language answer to the identified at least one question with a user interface of the computing device, wherein the natural language answer comprises a first representation of a measure that corresponds to a first value;
   subsequently identifying by the server system a subsequent value of the measure;
   selecting by the server system a subsequent natural language answer based at least in part on values corresponding to user votes indicating preferences associated with one or both of the natural language answer and the subsequent natural language answer, wherein the subsequent natural language answer comprises a different representation of the measure that corresponds to the subsequent value, and the selecting the subsequent natural language answer comprises:
      determining a difference between the first value and the subsequent value;
      comparing the difference between the first value and the subsequent value to a threshold; and
      consequent to the difference satisfying the threshold, selecting the subsequent natural language answer; and
   transmitting by the server system another transmission to the computing device or a second computing device via the network to cause display of the subsequent natural language answer with the user interface of the computing device or a second user interface of the second computing device.

2. The method of claim 1, wherein the defining the analysis to be performed on the set of data for each question of the plurality of questions comprises:
   creating one or more question templates for the question;
   identifying one or more measures of the analysis and one or more dimensions of a collection of data upon which the analysis will be performed;
   defining processes for performing the analysis;
   identifying one or more observations available on results of performing the defined processes; and
   creating one or more answer templates for each identified observation.

3. The method of claim 2, wherein the received information comprises a natural language query, and wherein the processing the received information comprises applying at least one question template of the one or more question templates to the received information.

4. The method of claim 2, wherein the performing the defined analysis for the identified at least one question comprises:
   identifying the analysis to be performed and dimensions of data to be used based at least partially on the identified at least one question;
   collecting, from the set of data, a subset of data based at least partially on the identified dimensions;
   executing the defined processes for performing the analysis on the collected subset of data;
   populating one or more answer templates with analysis results based at least partially on the identified one or more observations for the analysis; and
   generating the natural language answer based at least partially on the populated one or more answer templates.

5. The method of claim 4, wherein the collecting, from the set of data, the subset of data based at least partially on the identified dimensions comprises using an attribute-weighted data mining algorithm.

6. The method of claim 1, wherein the transmitting the natural language answer comprises providing one or more of an email, a micro-blog message, an instant message, a voice message, and/or a graphical representation, and/or a textual representation on a web page.

7. A system comprising:
   a server system comprising one or more servers and a memory storing a set of instructions which, when executed by the one or more servers, causes the server system to generate natural language insights about a set of data at least partially by:
      storing the set of data in one or more data stores of the server system;
      defining an analysis to be performed on the set of data for each question of a plurality of questions;
      processing information received from a computing device via a network to identify at least one question of the plurality of questions;
      performing the defined analysis for the identified at least one question on at least a subset of the set of data, and generating a natural language answer to the identified at least one question based at least in part on performing the defined analysis for the identified at least one question;
      transmitting a transmission to the computing device to cause display of the natural language answer to the identified at least one question, wherein the natural language answer comprises a first representation of a measure that corresponds to a first value;
      subsequently identifying a subsequent value of the measure;
      selecting a subsequent natural language answer based at least in part on values corresponding to user votes indicating preferences associated with the natural language answer one or both of the subsequent natural language answer, wherein the subsequent natural language answer comprises a different representation of the measure that corresponds to the subsequent value, and the selecting the subsequent natural language answer comprises:
  determining a difference between the first value and the subsequent value;
  comparing the difference between the first value and the subsequent value to a threshold; and
  consequent to the difference satisfying the threshold, selecting the subsequent natural language answer; and
transmitting another transmission to the computing device or a second computing device via the network to cause display of the subsequent natural language answer with a user interface of the computing device or a second user interface of the second computing device.

8. The system of claim 7, wherein the defining the analysis to be performed on the set of data for each question of the plurality of questions comprises:
  creating one or more question templates for the question;
  identifying one or more measures of the analysis and one or more dimensions of a collection of data upon which the analysis will be performed;
  defining processes for performing the analysis;
  identifying one or more observations available on results of performing the defined processes; and
  creating one or more answer templates for each identified observation.

9. The system of claim 8, wherein the received information comprises a natural language query, and wherein the processing the received information comprises applying at least one of the one or more question templates to the received information.

10. The system of claim 8, wherein the performing the defined analysis for the identified at least one question comprises:
  identifying the analysis to be performed and dimensions of data to be used based at least partially on the identified at least one question;
  collecting, from the set of data, a subset of data based at least partially on the identified dimensions;
  executing the defined processes for performing the analysis on the collected subset of data;
  populating one or more answer templates with analysis results based at least partially on the identified one or more observations for the analysis; and
  generating the natural language answer based at least partially on the populated one or more answer templates.

11. The system of claim 10, wherein the collecting, from the set of data, the subset of data based at least partially on the identified dimensions comprises using an attribute-weighted data mining algorithm.

12. The system of claim 7, wherein the transmitting the natural language answer comprises providing one or more of an email, a micro-blog message, an instant message, a voice message, a graphical representation, and/or a textual representation on a web page.

13. A computer-readable memory, which is non-transitory and comprises a set of instructions stored therein which, when executed by a server system, causes the server system to generate natural language insights about a set of data at least partially by:
  storing the set of data in one or more data stores of the server system;
  defining an analysis to be performed on the set of data for each question of a plurality of questions;
  processing information received from a computing device via a network to identify at least one question of the plurality of questions;
  performing the defined analysis for the identified question on at least a subset of the set of data, and generating a natural language answer to the identified at least one question based at least in part on performing the defined analysis for the identified at least one question;
  transmitting a transmission to the computing device to cause display of the natural language answer to the identified at least one question, wherein the natural language answer comprises a first representation of a measure that corresponds to a first value;
  subsequently identifying a subsequent value of the measure;
  selecting a subsequent natural language answer based at least in part on values corresponding to user votes indicating preferences associated with the natural language answer one or both of the subsequent natural language answer, wherein the subsequent natural language answer comprises a different representation of the measure that corresponds to the subsequent value, and the selecting the subsequent natural language answer comprises:
    determining a difference between the first value and the subsequent value;
    comparing the difference between the first value and the subsequent value to a threshold; and
    consequent to the difference satisfying the threshold, selecting the subsequent natural language answer; and
  transmitting another transmission to the computing device or a second computing device via the network to cause display of the subsequent natural language answer with a user interface of the computing device or a second user interface of the second computing device.

14. The computer-readable memory of claim 13, wherein the defining the analysis to be performed on the set of data for each question of the plurality of questions comprises:
  creating one or more question templates for the question;
  identifying one or more measures of the analysis and one or more dimensions of a collection of data upon which the analysis will be performed;
  defining processes for performing the analysis;
  identifying one or more observations available on results of performing the defined processes; and
  creating one or more answer templates for each identified observation.

15. The computer-readable memory of claim 14, wherein the received information comprises a natural language query, and wherein the processing the received information comprises applying at least one question template of the one or more question templates to the received information.

16. The computer-readable memory of claim 14, wherein the performing the defined analysis for the identified at least one question comprises:
  identifying the analysis to be performed and dimensions of data to be used based at least partially on the identified at least one question;
  collecting, from the set of data, a subset of data based at least partially on the identified dimensions;
  executing the defined processes for performing the analysis on the collected subset of data;

populating one or more answer templates with analysis results based at least partially on the identified one or more observations for the analysis; and generating the natural language answer based at least partially on the populated one or more answer templates.

17. The computer-readable memory of claim 16, wherein the collecting, from the set of data, the subset of data based at least partially on the identified dimensions comprises using an attribute-weighted data mining algorithm.

18. The computer-readable memory of claim 13, wherein the transmitting the natural language answer comprises providing one or more of an email, a micro-blog message, an instant message, a voice message, or a graphical representation, and/or a textual representation on a web page.

* * * * *